| (12) | United States Patent | (10) Patent No.: | US 10,286,876 B2 |
|---|---|---|---|
| | Watanabe | (45) Date of Patent: | May 14, 2019 |

(54) SMART ENTRY SYSTEM AND CONTROL METHOD FOR THE SAME

(71) Applicant: HONDA MOTOR CO., LTD., Minato-ku, Tokyo (JP)

(72) Inventor: Tomonori Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/917,963

(22) Filed: Mar. 12, 2018

(65) Prior Publication Data

US 2018/0265041 A1 Sep. 20, 2018

(30) Foreign Application Priority Data

Mar. 17, 2017 (JP) ................. 2017-052223

(51) Int. Cl.
*B60R 25/31* (2013.01)
*B60R 25/24* (2013.01)
*B60R 25/01* (2013.01)
*G07C 9/00* (2006.01)
*E05B 81/78* (2014.01)

(52) U.S. Cl.
CPC .............. *B60R 25/31* (2013.01); *B60R 25/01* (2013.01); *B60R 25/24* (2013.01); *E05B 81/77* (2013.01); *G07C 9/00* (2013.01); *E05B 81/78* (2013.01)

(58) Field of Classification Search
CPC .................. B60R 25/31; B60R 25/34
See application file for complete search history.

(56) References Cited

U.S. PATENT DOCUMENTS

| 8,922,340 | B2 * | 12/2014 | Salter | ...................... E05B 81/76 340/426.28 |
|---|---|---|---|---|
| 2005/0253684 | A1 * | 11/2005 | Kumazaki | ........... B60R 25/2036 340/5.62 |
| 2015/0102905 | A1 * | 4/2015 | Miyazawa | ......... G07C 9/00182 340/5.61 |
| 2015/0368935 | A1 * | 12/2015 | Sugita | ..................... E05B 81/77 70/263 |
| 2016/0138305 | A1 | 5/2016 | Noguchi et al. | |

FOREIGN PATENT DOCUMENTS

| JP | 2008-106548 | 5/2008 |
|---|---|---|
| JP | 2009-135039 | 6/2009 |
| JP | 2016-94723 | 5/2016 |

* cited by examiner

*Primary Examiner* — Nabil H Syed
(74) *Attorney, Agent, or Firm* — Amin, Turocy & Watson LLP

(57) ABSTRACT

A discriminating unit discriminates and detects a first unlocking operation performed on an unlock sensor by insertion of a user's hand into a space from a first direction, and a second unlocking operation performed on the unlock sensor by insertion of the user's hand into the space from a second direction. If the first unlocking operation is detected, an unlock order unit causes lock devices to unlock all the doors of a vehicle, and if the second unlocking operation is detected, the unlock order unit causes the lock device to unlock only the door of a driver's seat of the vehicle.

7 Claims, 7 Drawing Sheets

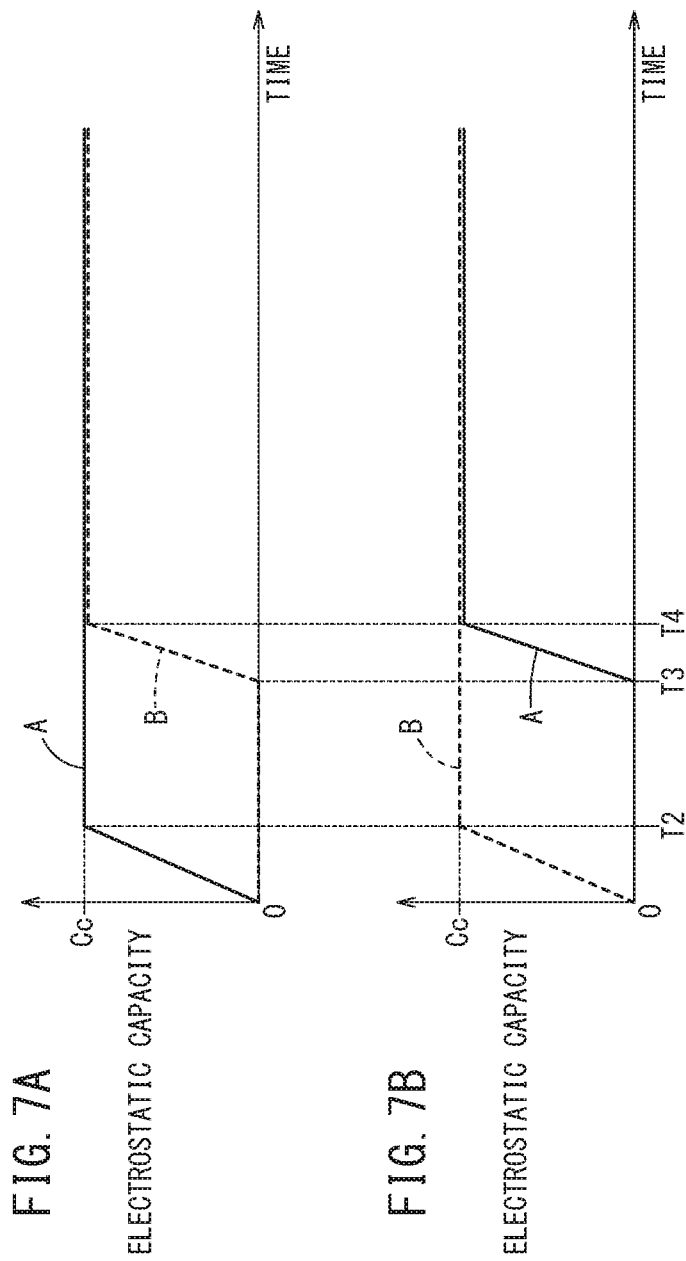

SMART ENTRY SYSTEM AND CONTROL METHOD FOR THE SAME

CROSS-REFERENCE TO RELATED APPLICATION

This application is based upon and claims the benefit of priority from Japanese Patent Application No. 2017-052223 filed on Mar. 17, 2017, the contents of which are incorporated herein by reference.

BACKGROUND OF THE INVENTION

Field of the Invention

The present invention relates to a smart entry system for locking or unlocking doors of a vehicle without using a mechanical key, and a control method for such a smart entry system.

Description of the Related Art

Each of Japanese Laid-Open Patent Publication No. 2008-106548 and Japanese Laid-Open Patent Publication No. 2016-094723 discloses a smart entry system (keyless entry system) in which a door of a driver's seat and all the doors are unlocked selectively. In the system according to Japanese Laid-Open Patent Publication No. 2008-106548, in which first and second switches are provided near a door, only the door of the driver's seat is unlocked by the operation of the first switch and all the doors are unlocked by the operation of the second switch. In the system according to Japanese Laid-Open Patent Publication No. 2016-094723, in which a switch is provided near a door, only the door of the driver's seat is unlocked by a short pressing of the switch and all the doors are unlocked by a long pressing of the switch.

Japanese Laid-Open Patent Publication No. 2009-135039 discloses a device in which a contact sensor is provided to a door handle. In this device, in order to prevent the wrong detection when rain water collects on a top surface of the door handle, the sensitivity of the contact sensor on an upper side of the door handle is set lower than the sensitivity of the contact sensor on a lower side.

SUMMARY OF THE INVENTION

In a case of selectively unlocking the doors, the conventional smart entry system requires an operation of separately pressing a plurality of switches, an operation of pressing a switch a plurality of times for a predetermined period, an operation of pressing a switch for a long time, or the like. In these cases, a user needs to do an unfamiliar operation from the aspect of pressing (touching) a switch. The user needs to know the relation between the unfamiliar operation that the user is not used to, and a control achieved by that operation, and therefore feels bothered. Furthermore, doing such an unfamiliar operation itself bothers the user.

The present invention has been made in consideration of the above problem, and an object is to provide a smart entry system that is easily used by a user, and a control method for such a smart entry system.

A smart entry system according to the present invention includes: lock devices configured to lock and unlock doors of a vehicle; a door handle facing a body panel of the door of a driver's seat through a space, and being configured so that a user's hand can be inserted into the space from a first direction and a second direction; an unlock sensor provided to the door handle and configured to detect an unlocking operation performed by the user's hand; a communications unit provided to the vehicle and configured to communicate with a mobile device carried by the user; and a control unit configured to cause the lock device of the driver's seat to unlock the door if the unlock sensor detects the unlocking operation and communication between the communications unit and the mobile device is established, wherein the control unit is configured to discriminate and detect a first unlocking operation performed on the unlock sensor by insertion of the user's hand into the space from the first direction, and a second unlocking operation performed on the unlock sensor by insertion of the user's hand into the space from the second direction, and the control unit is configured to cause the lock devices to unlock all the doors of the vehicle if the first unlocking operation is detected, and cause the lock device to unlock only the door of the driver's seat if the second unlocking operation is detected.

According to the above structure, the user who unlocks the doors selectively only needs to change the inserting direction of his hand into the space between the door handle and the body panel, and it is unnecessary for the user to remember or perform the conventional unfamiliar operation of the switch. Thus, the user does not feel bothered and the selective unlocking operation of the doors can be facilitated. As a result, the merchantability is improved.

The unlock sensor may be configured to detect an amount of change in electrostatic capacity. A change characteristic of the electrostatic capacity in a case where the first unlocking operation is performed, and a change characteristic of the electrostatic capacity in a case where the second unlocking operation is performed may be different. The control unit may be configured to discriminate which one of the first unlocking operation and the second unlocking operation is performed on a basis of the change characteristic of the electrostatic capacity.

In the above structure, it is only necessary to provide the electrode to the door, and this structure is simpler than the structure in which a switch or the like is provided.

The amount of change in a change period of the electrostatic capacity in the first unlocking operation may be larger than the amount of change in a change period of the electrostatic capacity in the second unlocking operation.

In the above structure, it is only necessary to detect the amount of change in the change period; therefore, it is easy to discriminate between the first unlocking operation and the second unlocking operation.

The unlock sensor may include a side surface electrode facing the body panel, and a top surface electrode positioned on a first direction side and being approximately orthogonal to the side surface electrode, in a cross section in a longitudinal direction.

In the above structure, it is possible to change the sensitivity of the unlock sensor on the first direction side and the sensitivity of the unlock sensor on the second direction side easily.

The unlock sensor may include at least a first sensor and a second sensor configured to detect the amount of change in electrostatic capacity. A change characteristic of the electrostatic capacity of the first sensor and a change characteristic of the electrostatic capacity of the second sensor may be different in each of a case where the first unlocking operation is performed and a case where the second unlocking operation is performed. The control unit may be configured to discriminate which one of the first unlocking operation and the second unlocking operation is performed on a basis of the change characteristic of the electrostatic capacity.

In the above structure, it is possible to discriminate between the first unlocking operation and the second unlocking operation more easily by using the two sensors.

The first direction may be a direction that coincides with an upward direction of the vehicle, and the second direction may be a direction that coincides with a downward direction of the vehicle.

The above structure can be used for a vehicle in which a longitudinal direction of the door handle coincides approximately with the vehicle length direction.

A control method for a smart entry system according to the present invention including lock devices configured to lock and unlock doors of a vehicle, a door handle facing a body panel of the door of a driver's seat through a space and being configured so that a user's hand can be inserted into the space from a first direction and a second direction, an unlock sensor provided to the door handle and configured to detect an unlocking operation performed by the user's hand, a communications unit provided to the vehicle and configured to communicate with a mobile device carried by the user, and a control unit, if communication between the communications unit and the mobile device is established, the method comprising the steps of: discriminating and detecting a first unlocking operation performed on the unlock sensor by insertion of the user's hand into the space from the first direction, and a second unlocking operation performed on the unlock sensor by insertion of the user's hand into the space from the second direction, by the control unit; and causing the lock devices to unlock all the doors of the vehicle if the first unlocking operation is detected, and causing the lock device to unlock only the door of the driver's seat if the second unlocking operation is detected, by the control unit.

In the above structure, the user who unlocks the doors selectively only needs to change the inserting direction of his hand into the space between the door handle and the body panel, and it is unnecessary for the user to remember or perform the conventional unfamiliar operation of the switch. This makes the user feel less bothered and the selective unlocking operation of the doors 16 can be facilitated. As a result, the merchantability is improved.

According to the present invention, the user does not feel bothered in the unlocking operation, and it becomes easier to unlock the doors selectively. As a result, the merchantability is improved.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7A and FIG. 7B are diagrams each illustrating a time-electrostatic capacity characteristic in a case where a hand is inserted into a space at a predetermined speed and is brought into contact with a side surface part in the second embodiment.

DESCRIPTION OF THE PREFERRED EMBODIMENTS

Preferred embodiments of a smart entry system and a control method for the same according to the present invention will hereinafter be described in detail with reference to the attached drawings.

1 First Embodiment

[1.1 Structure of Smart Entry System 10]

Figure 1:
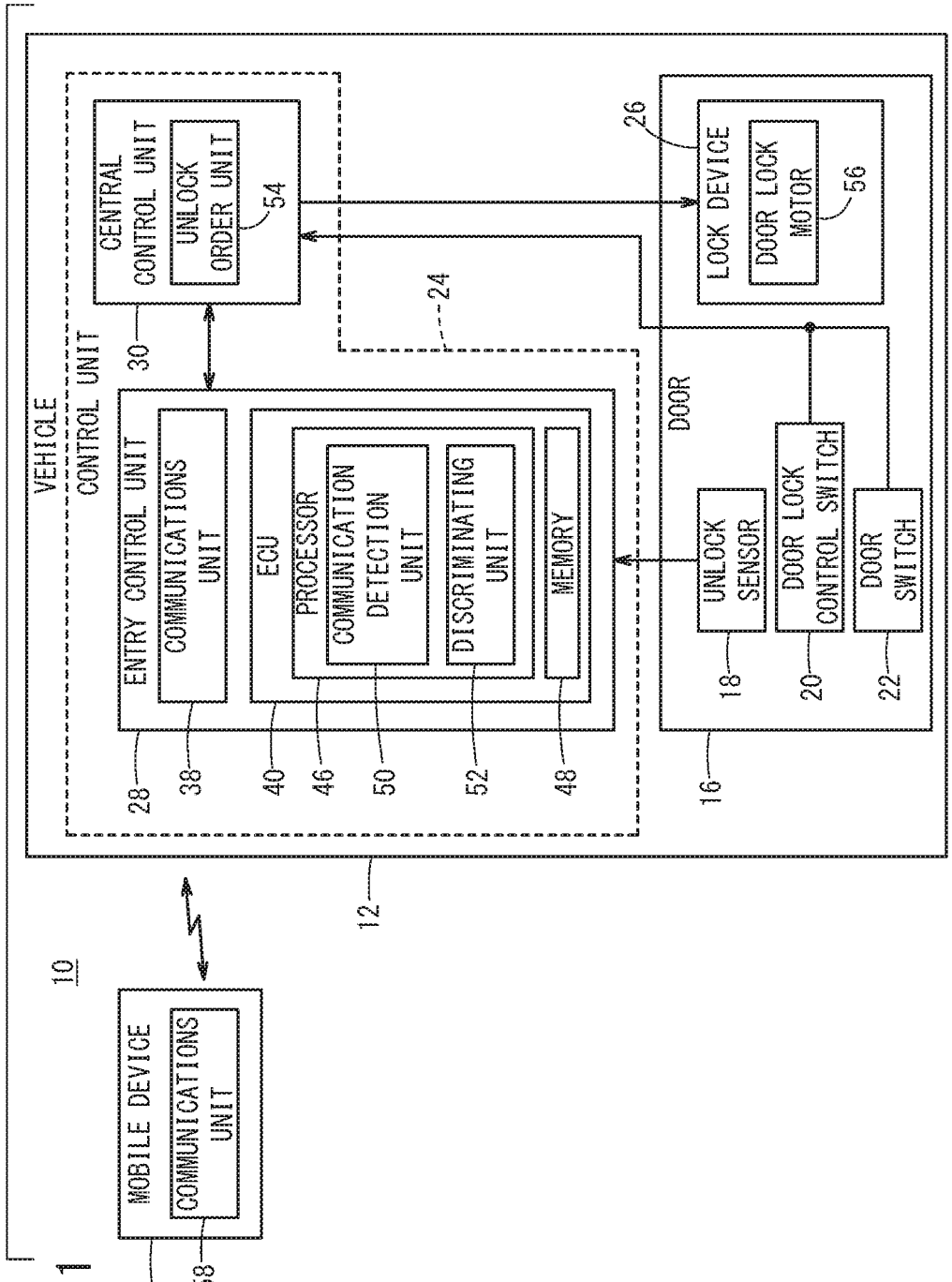
FIG. 1 is a block diagram illustrating a structure of a smart entry system according to one embodiment of the present invention.

As illustrated in FIG. 1, a smart entry system according to one embodiment of the present invention includes a vehicle 12, and a mobile device 14 that is carried by a user of the vehicle 12.

[1.1.1 Structure of Vehicle 12]

The vehicle 12 includes doors 16 including a door 16 of a driver's seat, an unlock sensor 18, a door lock control (sill control) switch 20, a door switch 22, a control unit 24, and a lock device 26 for each door 16. The control unit 24 includes an entry control unit 28 and a central control unit 30. The unlock sensor 18 and the entry control unit 28 are connected to each other through an on-vehicle communications network. The door lock control switch 20, the door switch 22, and the lock device 26 are connected to the central control unit 30 through the on-vehicle communications network. The entry control unit 28 and the central control unit 30 are connected to each other through the on-vehicle communications network. Note that to the central control unit 30, another device that is not shown, such as a driving device for a windshield wiper, an air conditioner, or the like is connected.

Figure 2:
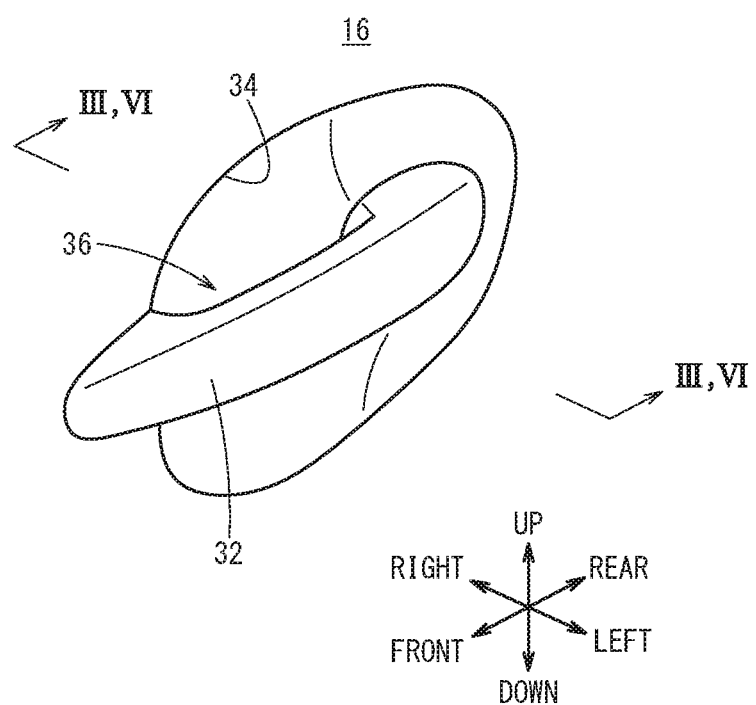
FIG. 2 is a diagram illustrating a door handle provided to a door in a simplified manner.

As illustrated in FIG. 2, a door handle 32 is provided to the door 16 of the driver's seat. A space 36 is formed between the door handle 32 and a body panel 34 forming a surface of the door 16. A user can insert his hand H (FIG. 3) into the space 36 from a first direction and a second direction. The first direction and the second direction are opposite to each other. FIG. 2 illustrates the embodiment in which the hand H can be inserted into the space 36 from the first direction that coincides with an upward direction of the vehicle 12 and from the second direction that coincides with a downward direction of the vehicle 12. However, the hand H can be inserted in two other directions (for example, a direction that coincides with a front direction of the vehicle 12 and a direction that coincides with a rear direction of the vehicle 12).

Back to FIG. 1, the description of the vehicle 12 is continued. The unlock sensor 18 is provided to the door handle 32. The details of the unlock sensor 18 will be described below (see [1.1.3] and [1.1.4]). The door lock control switch 20 detects locking and unlocking by each lock device 26. The door switch 22 detects opening and closing of each door 16.

The entry control unit 28 includes a communications unit 38 and an ECU 40, and treats the information related to the locking and the unlocking. The communications unit 38 includes a transmission unit (not shown) that transmits electric waves in an LF band (specifically, a request signal that is transmitted to the mobile device 14) on a regular basis, and a reception unit (not shown) that receives electric waves in an RF (UHF) band (specifically, a response signal that is transmitted from the mobile device 14). The ECU 40 functions as a communication detection unit 50 and a discriminating unit 52 by causing a processor 46 such as a CPU to read out programs from a memory 48 and execute the programs.

The communication detection unit 50 compares the identification information included in the response signal received by the communications unit 38 with the identification information stored in the memory 48, and if these pieces of information are the same, the communication detection unit 50 detects (authenticates) that the communication is established. The discriminating unit 52 discriminates and detects a first unlocking operation that is performed on the unlock sensor 18 by the insertion of the user's hand H into the space 36 from the first direction, and a second unlocking operation that is performed on the unlock sensor 18 by the insertion of the user's hand H into the space 36 from the second direction. How to discriminate these operations will be described below (see [1.1.4]).

The central control unit 30 is an ECU and orders to control the locking, the unlocking, and the like. The central control unit 30 functions as an unlock order unit 54 by causing a processor (not shown) such as a CPU to read out programs from a memory (not shown) and execute the programs. The unlock order unit 54 outputs an unlock order to the lock device 26 if the entry control unit 28 detects the establishment of the communication and detects the first or second unlocking operation.

The lock device 26 includes a door lock motor 56, a driving circuit (not shown) that drives the door lock motor 56 in accordance with the unlock order output from the central control unit 30, and a locking mechanism (not shown) that locks and unlocks the door 16 by the driving power of the door lock motor 56.

[1.1.2 Structure of Mobile Device 14]

The mobile device 14 is a key fob. The mobile device 14 includes a communications unit 58, and a CPU, a memory, and an operation switch that are not shown. When entering a reception region of a request signal transmitted from the communications unit 38 of the entry control unit 28, the mobile device 14 receives the request signal, performs an authentication process, and transmits a response signal including identification information.

[1.1.3 Structure of Unlock Sensor 18 in First Embodiment]

Figure 3:
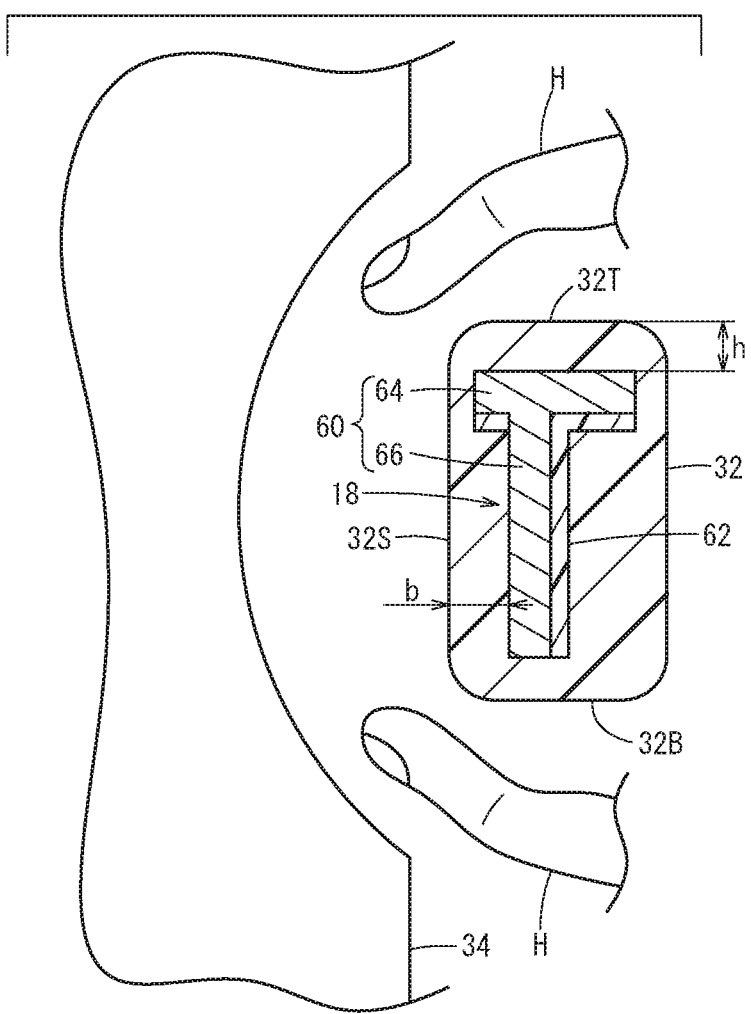
FIG. 3 is a cross-sectional view taken along III-III in FIG. 2, illustrating an unlock sensor according to a first embodiment.

With reference to FIG. 3, the unlock sensor 18 according to the first embodiment is described. Inside the door handle 32, an electrode 60 and a GND 62 extending along a longitudinal direction (here, vehicle length direction) are provided. The electrode 60 is a sensor member to detect the contact/non-contact (approach/non-approach) of the user to the door handle 32, and here forms a touch sensor that detects a change in electrostatic capacity. The touch sensor may be either a charge transfer type or an integration type. The touch sensor functions as the unlock sensor 18.

The electrode 60 includes a top surface electrode 64, and a side surface electrode 66 that is positioned lower than the top surface electrode 64. The top surface electrode 64 has a planar or approximately planar shape that is parallel to the vehicle length direction and a vehicle width direction of the vehicle 12, and is provided along a top surface part 32T of the door handle 32 at a position away from the top surface part 32T by a distance h. The side surface electrode 66 has a planar or approximately planar shape that is parallel to the vehicle length direction and a vehicle height direction of the vehicle 12, and is provided along a side surface part 32S of the door handle 32 at a position away from the side surface part 32S by a distance b. The side surface electrode 66 faces the body panel 34. A lower end surface of the top surface electrode 64 in the vehicle height direction is connected to an upper end part of the side surface electrode 66 in the vehicle height direction in an approximately orthogonal manner. In the embodiment illustrated in FIG. 3, the cross-sectional shape of the electrode 60 is an approximately T-shape.

As the distance h is shorter, the amount of change in electrostatic capacity is increased in the first unlocking operation in which the user's hand H is inserted into the space 36 from the first direction (upward direction). As the distance b is longer, the amount of change in electrostatic capacity is decreased in the second unlocking operation in which the user's hand H is inserted into the space 36 from the second direction (downward direction).

That is to say, by shortening the distance h as much as possible and extending the distance b as much as possible, the first unlocking operation and the second unlocking operation can be discriminated more easily. However, when the distance b is too long, it becomes difficult to detect the change in electrostatic capacity; thus, there is an upper limit in the distance b.

[1.1.4 Time-Electrostatic Capacity Characteristic of Unlock Sensor 18 in First Embodiment]

Figure 4:
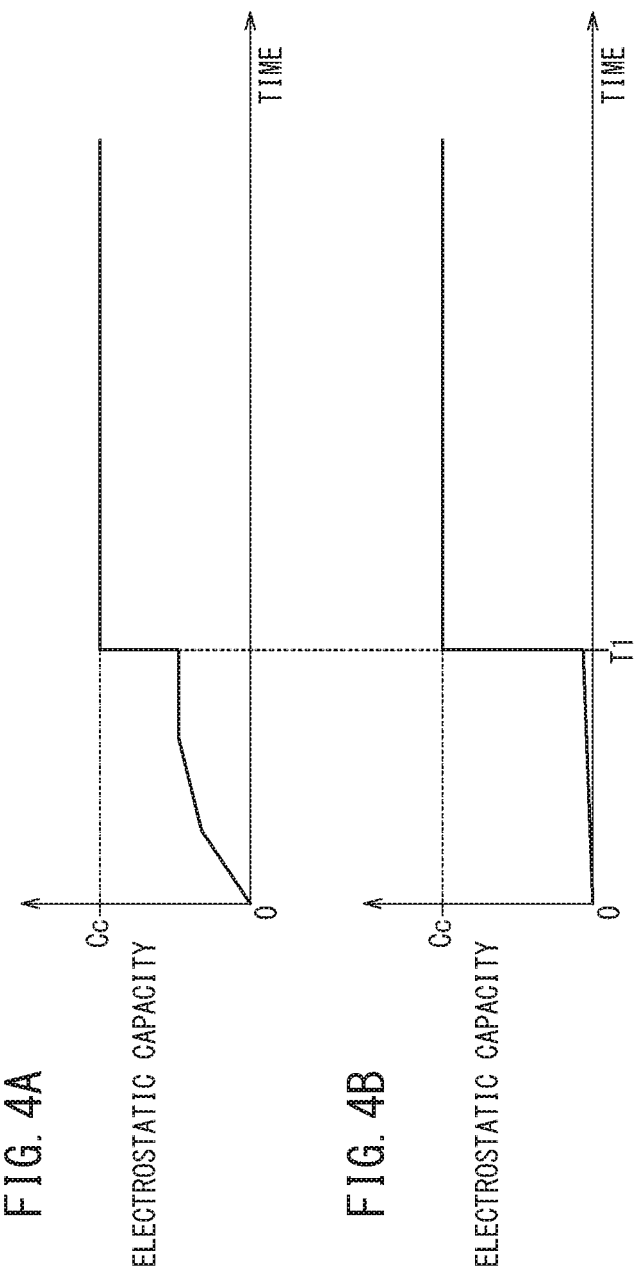
FIG. 4A and FIG. 4B are diagrams each illustrating a time-electrostatic capacity characteristic in a case where a hand is inserted into a space at a predetermined speed and is brought into contact with a side surface part in the first embodiment.

The discriminating unit 52 detects a voltage corresponding to the electrostatic capacity of the unlock sensor 18, compares the detection result with the characteristics stored in the memory 48 that are shown in FIG. 4A and FIG. 4B, and discriminates whether the hand H is inserted into the space 36 from above or from below, that is, whether the operation is the first unlocking operation or the second unlocking operation.

With reference to FIG. 4A and FIG. 4B, description is made of a difference in change of the electrostatic capacity when the insertion direction of the hand H into the space 36 is different. FIG. 4A expresses the time-electrostatic capacity characteristic in the first unlocking operation, and FIG. 4B expresses the time-electrostatic capacity characteristic in the second unlocking operation. As the hand H approaches the space 36, the electrode 60 detects the approach and the electrostatic capacity starts to change (time point 0). When the hand H is inserted into the space 36 to be in contact with the side surface part 32S, the electrostatic capacity increases suddenly (time point T1). While the hand H is in contact with the side surface part 32S, the electrostatic capacity is a constant electrostatic capacity Cc.

The comparison between the characteristic in FIG. 4A and the characteristic in FIG. 4B indicates that the amount of change in electrostatic capacity from the time point 0 to the time point T1 is larger in the characteristic in FIG. 4A. This is because the top surface electrode 64 is provided near the top surface part 32T of the door handle 32 and the electrode corresponding to the top surface electrode 64 is not provided near a bottom surface part 32B of the door handle 32. By such a structure, the amount of change (change ratio) in electrostatic capacity becomes different between in the case where the hand H approaches the door handle 32 from the upward direction and in the case where the hand H approaches the door handle 32 from the downward direction, and thus, both operations can be discriminated.

In a specific discriminating method, for example, a maximum value of the electrostatic capacity from the time point 0 to the time point T1 is calculated, and the obtained maximum value is compared with the value of the characteristic in FIG. 4A (maximum value from time point 0 to time point T1) and the value of the characteristic in FIG. 4B (maximum value from time point 0 to time point T1) that are calculated in advance by simulation. Then, which one of the values is closer to the obtained maximum value of the electrostatic capacity from the time point 0 to the time point T1 is determined. Alternatively, a time differential value of the electrostatic capacity may be calculated, and the obtained value may be compared with the value of the characteristic in FIG. 4A (time differential value of the electrostatic capacity from time point 0 to time point T1) and the value of the characteristic in FIG. 4B (time differential value of the electrostatic capacity from time point 0 to time point T1) that are calculated in advance by simulation.

[1.2 Description of Operation of Smart Entry System 10]

Figure 5:
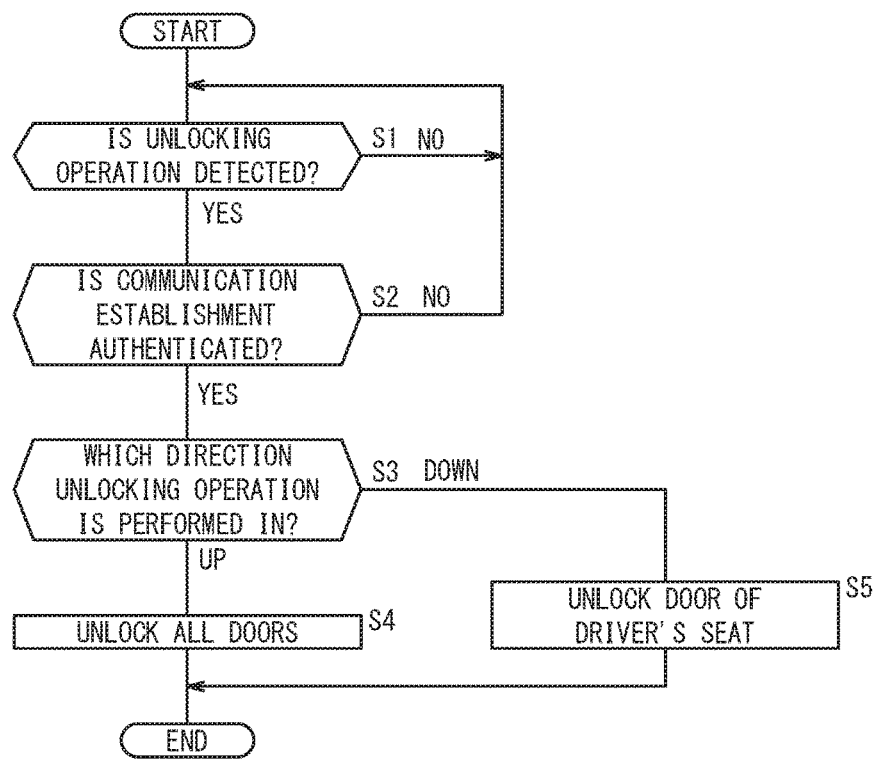
FIG. 5 is a flowchart for describing an operation of the smart entry system.

With reference to FIG. 5, an operation of the smart entry system 10 is described. In step S1, whether the unlocking operation is performed is determined. Here, the unlocking operation refers to the touch of the user's hand H on the side surface part 32S. The discriminating unit 52 determines that the unlocking operation is performed when the electrostatic capacity detected by the unlock sensor 18 becomes the constant electrostatic capacity Cc (or a value close to the constant electrostatic capacity Cc), and determines that the unlocking operation is not performed when the electrostatic capacity is less than the constant electrostatic capacity Cc (or a value close to the constant electrostatic capacity Cc). If the unlocking operation is performed (step S1: YES), the process advances to step S2. On the other hand, if the unlocking operation is not performed (step S1: NO), the process is repeated.

If the process advances from step S1 to step S2, whether the communication between the communications unit 38 of the entry control unit 28 and the communications unit 58 of the mobile device 14 is established is determined, that is, whether the establishment of the communication is authenticated is determined. If the communication detection unit 50 detects the establishment of the communication (communication is performed) (step S2: YES), the process advances to step S3. On the other hand, if the communication detection unit 50 does not detect (does not authenticate) the establishment of the communication (step S2: NO), the process returns to step S1.

If the process advances from step S2 to step S3, the direction of the unlocking operation is determined. Based on the mode of change in electrostatic capacity detected by the unlock sensor 18 until the unlocking operation is performed, the discriminating unit 52 discriminates the direction of the unlocking operation, that is, the first unlocking operation and the second unlocking operation. When the first unlocking operation is performed in which the hand H is inserted into the space 36 from above (step S3: up), the process advances to step S4. On the other hand, when the second unlocking operation is performed in which the hand H is inserted into the space 36 from below (step S3: down), the process advances to step S5.

If the process advances from step S3 to step S4, the lock devices 26 unlock all the doors 16. The unlock order unit 54 outputs the unlock order to the lock devices 26 of all the doors 16. Then, the door lock motor 56 of each lock device 26 is driven to unlock the door 16.

If the process advances from step S3 to step S5, the lock device 26 unlocks only the door 16 of the driver's seat. The unlock order unit 54 outputs the unlock order to the lock device 26 of the door 16 of the driver's seat. Then, the door lock motor 56 of the lock device 26 of the driver's seat is driven to unlock the door 16.

[1.3 Summary of First Embodiment]

The smart entry system 10 according to the first embodiment includes: the lock devices 26 that lock and unlock the doors 16 of the vehicle 12; the door handle 32 that faces the body panel 34 of the door 16 of the driver's seat through the space 36, and is configured so that the user's hand H can be inserted into the space 36 from the first direction (upward direction) and the second direction (downward direction); the unlock sensor 18 that is provided to the door handle 32 and detects the unlocking operation performed by the user's hand H; the communications unit 38 that is provided to the vehicle 12 and communicates with the mobile device 14 carried by the user; and the control unit 24 (communication detection unit 50, discriminating unit 52, unlock order unit 54) that causes the lock device 26 of the driver's seat to unlock the door 16 if the unlock sensor 18 detects the unlocking operation and the communication between the communications unit 38 and the mobile device 14 is established. The control unit 24 (discriminating unit 52) discriminates and detects the first unlocking operation performed on the unlock sensor 18 by the insertion of the user's hand H into the space 36 from the first direction, and the second unlocking operation performed on the unlock sensor 18 by the insertion of the user's hand H into the space 36 from the second direction (step S3 in FIG. 5). If the first unlocking operation is detected (step S3 in FIG. 5: up), the control unit 24 (unlock order unit 54) causes the lock devices 26 to unlock all the doors 16 of the vehicle 12 (step S4 in FIG. 5). If the second unlocking operation is detected (step S3 in FIG. 5: down), the control unit 24 (unlock order unit 54) causes the lock device 26 to unlock only the door 16 of the driver's seat (step S5 in FIG. 5).

In the above structure, the user who unlocks the doors 16 selectively only needs to change the inserting direction of the hand H into the space 36 between the door handle 32 and the body panel 34, and it is unnecessary for the user to remember or perform the conventional unfamiliar operation of the switch. Thus, the user does not feel bothered, and it becomes easier to unlock the doors selectively. As a result, the merchantability is improved.

The unlock sensor 18 detects the amount of change in electrostatic capacity, and the change characteristic of the electrostatic capacity in the case where the first unlocking operation is performed (FIG. 4A) and the change characteristic of the electrostatic capacity in the case where the second unlocking operation is performed (FIG. 4B) are different. The discriminating unit 52 discriminates the first unlocking operation and the second unlocking operation on the basis of the change characteristic of the electrostatic capacity (FIG. 4A and FIG. 4B). In the above structure, it is only necessary to provide the electrode 60 to the door 16, and the structure is simpler than the structure in which a switch or the like is provided.

As illustrated in FIG. 4A and FIG. 4B, the amount of change in the change period (time point 0 to time point T1) of the electrostatic capacity in the first unlocking operation is larger than the amount of change in the change period (time point 0 to time point T1) of the electrostatic capacity in the second unlocking operation. In the above structure, it is only necessary to detect the amount of change in the change period (time point 0 to time point T1); therefore, it is easy to discriminate the first unlocking operation and the second unlocking operation.

As illustrated in FIG. 3, the unlock sensor 18 includes the side surface electrode 66 that faces the body panel 34 and the top surface electrode 64 that is positioned on the first direction side and is approximately orthogonal to the side surface electrode 66 along the cross section in the longitudinal direction. In the above structure, the sensitivity of the unlock sensor 18 on the first direction side and the sensitivity thereof on the second direction side can be changed with a simple structure.

2 Second Embodiment

Description is made of a part of a second embodiment that is different from the first embodiment. The second embodiment is different from the first embodiment in a mode of the unlock sensor 18. In regard to the unlock sensor 18 according to the second embodiment, the description is simplified by denoting the same structure as that of the unlock sensor 18 according to the first embodiment with the same reference.

[2.1 Structure of Unlock Sensor 18 in Second Embodiment]

Figure 6:
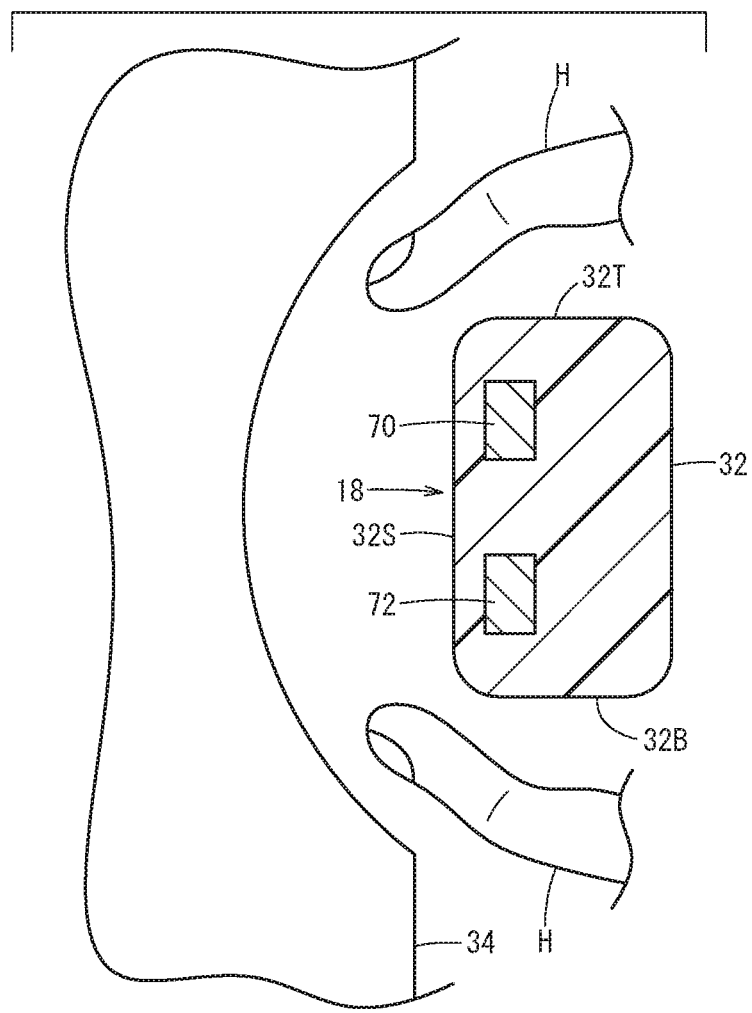
FIG. 6 is a cross-sectional view taken along line VI-VI in FIG. 2, illustrating an unlock sensor according to a second embodiment.

With reference to FIG. 6, the unlock sensor 18 according to the second embodiment is described. Inside the door handle 32, a first electrode 70 and a second electrode 72 are provided in the longitudinal direction (here, vehicle length direction). The first electrode 70 and the second electrode 72 are sensor members that detect the contact/non-contact (approach/non-approach) of the user to the door handle 32, and here, form touch sensors that detect the change in electrostatic capacity. The touch sensor may be either a charge transfer type or an integration type. The touch sensors function as the unlock sensor 18.

The first electrode 70 and the second electrode 72 are both provided along the side surface part 32S. The positions of the first electrode 70 and the second electrode 72 in the vehicle width direction (left-right direction) and in the vehicle length direction are approximately the same. The first electrode 70 is closer to the top surface part 32T than the second electrode 72, that is, on the upper side. The second electrode 72 is closer to the bottom surface part 32B than the first electrode 70, that is, on the lower side.

[2.2 Characteristic of Time-Electrostatic Capacity of Unlock Sensor 18 in Second Embodiment]

A difference in change of the electrostatic capacity due to a difference in inserting direction of the hand H into the space 36 is described with reference to FIG. 7A and FIG. 7B. FIG. 7A illustrates a characteristic of the amount of change in time-electrostatic capacity of the first unlocking operation and FIG. 7B illustrates a characteristic of the amount of change in time-electrostatic capacity of the second unlocking operation. Note that in FIG. 7A and FIG. 7B, the characteristic of the first electrode 70 is expressed by a solid line A and the characteristic of the second electrode 72 is expressed by a dashed line B.

If the first unlocking operation in which the hand H is inserted into the space 36 from above is performed, the electrostatic capacity (solid line A) detected by the first electrode 70 starts to change (time point 0) before the electrostatic capacity (dashed line B) detected by the second electrode 72 as illustrated in FIG. 7A. Then, when the hand H is the closest to the first electrode 70, the electrostatic capacity becomes the constant electrostatic capacity Cc (time point T2). On the other hand, the electrostatic capacity (dashed line B) detected by the second electrode 72 starts to change (time point T3) after the electrostatic capacity (solid line A) detected by the first electrode 70. Then, when the hand H is the closest to the second electrode 72, the electrostatic capacity becomes the constant electrostatic capacity Cc (time point T4). Note that the time T2 and the time T3 may be reversed.

If the second unlocking operation in which the hand H is inserted into the space 36 from below is performed, the electrostatic capacity (dashed line B) detected by the second electrode 72 starts to change (time point 0) before the electrostatic capacity (solid line A) detected by the first electrode 70 as illustrated in FIG. 7B. Then, when the hand H is the closest to the second electrode 72, the electrostatic capacity becomes the constant electrostatic capacity Cc (time point T2). On the other hand, the electrostatic capacity (solid line A) detected by the first electrode 70 starts to change (time point T3) after the electrostatic capacity (dashed line B) detected by the second electrode 72. Then, when the hand H is the closest to the first electrode 70, the electrostatic capacity becomes the constant electrostatic capacity Cc (time point T4). Note that the time T2 and the time T3 may be reversed.

The discriminating unit 52 monitors the detection result of the first electrode 70 and the detection result of the second electrode 72, determines that the unlocking operation is performed from the direction of the electrode whose electrostatic capacity has changed earlier, and discriminates whether the first unlocking operation or the second unlocking operation is performed.

[2.3 Summary of Second Embodiment]

The unlock sensor 18 includes at least the first electrode 70 (first sensor) and the second electrode 72 (second sensor) that detect the amount of change in electrostatic capacity, and in each of the case where the first unlocking operation is performed and the case where the second unlocking operation is performed, the change characteristic of the electrostatic capacity of the first electrode 70 (solid line A in FIG. 7A and FIG. 7B) and the change characteristic of the electrostatic capacity of the second electrode 72 (dashed line B in FIG. 7A and FIG. 7B) are different. The discriminating unit 52 discriminates which one of the first unlocking operation and the second unlocking operation is performed on the basis of the change characteristic of the electrostatic capacity (FIG. 7A and FIG. 7B). In the above structure, by using the two sensors, the first unlocking operation and the second unlocking operation can be discriminated more easily.

The smart entry system and the control method for the same according to the present invention are not limited to the aforementioned embodiments, and various structures can be employed without departing from the gist of the present invention.

What is claimed is:

1. A smart entry system comprising:
    lock devices configured to lock and unlock doors of a vehicle;
    a door handle facing a body panel of the door of a driver's seat through a space, and being configured to allow a user's hand to be inserted into the space from a first direction and a second direction;
    an unlock sensor provided to the door handle and configured to detect an unlocking operation performed by the user's hand;
    a communications unit provided to the vehicle and configured to communicate with a mobile device carried by the user; and a processor configured to cause the lock device of the driver's seat to unlock the door if the unlock sensor detects the unlocking operation and communication between the communications unit and the mobile device is established, wherein the processor executes instructions to perform operations comprising: discriminating and detecting a first unlocking operation performed on the unlock sensor by insertion of the user's hand into the space from the first direction, and a second unlocking operation performed on the unlock sensor by insertion of the user's hand into the space from the second direction, and causing the lock devices to unlock all the doors of the vehicle if the first unlocking operation is detected, and causing the lock device to unlock only the door of the driver's seat if the second unlocking operation is detected.

2. The smart entry system according to claim 1, wherein the unlock sensor is configured to detect an amount of change in electrostatic capacity, a change characteristic of the electrostatic capacity in a case where the first unlocking operation is performed, and a change characteristic of the electrostatic capacity in a case where the second unlocking operation is performed are different, and wherein the operations further comprise discriminating in regard to which one of the first unlocking operation and the second unlocking operation is performed on a basis of the change characteristic of the electrostatic capacity.

3. The smart entry system according to claim 2, wherein the amount of change in a change period of the electrostatic capacity in the first unlocking operation is larger than the amount of change in a change period of the electrostatic capacity in the second unlocking operation.

4. The smart entry system according to claim 3, wherein the unlock sensor includes a side surface electrode facing the body panel, and a top surface electrode positioned on a first direction side and being approximately orthogonal to the side surface electrode, in a cross section in a longitudinal direction.

5. The smart entry system according to claim 1, wherein the unlock sensor includes at least a first sensor and a second sensor configured to detect the amount of change in electrostatic capacity, a change characteristic of the electrostatic capacity of the first sensor and a change characteristic of the electrostatic capacity of the second sensor are different in each of a case where the first unlocking operation is performed and a case where the second unlocking operation is performed, and wherein the operations further comprise discrimination in regard to which one of the first unlocking operation and the second unlocking operation is performed on a basis of the change characteristic of the electrostatic capacity.

6. The smart entry system according to claim 1, wherein the first direction is a direction that coincides with an upward direction of the vehicle, and the second direction is a direction that coincides with a downward direction of the vehicle.

7. A control method for a smart entry system including lock devices configured to lock and unlock doors of a vehicle, a door handle facing a body panel of the door of a driver's seat through a space, and being configured to allow a user's hand to be inserted into the space from a first direction and a second direction, an unlock sensor provided to the door handle and configured to detect an unlocking operation performed by the user's hand, a communications unit provided to the vehicle and configured to communicate with a mobile device carried by the user, and a processor that executes instructions to perform operations comprising:

if communication between the communications unit and the mobile device is established, discriminating and detecting a first unlocking operation performed on the unlock sensor by insertion of the user's hand into the space from the first direction, and a second unlocking operation performed on the unlock sensor by insertion of the user's hand into the space from the second direction, by the control unit; and causing the lock devices to unlock all the doors of the vehicle if the first unlocking operation is detected, and causing the lock device to unlock only the door of the driver's seat if the second unlocking operation is detected, by the control unit.

* * * * *